United States Patent [19]

MacDougall et al.

[11] Patent Number: 4,922,375
[45] Date of Patent: May 1, 1990

[54] ELECTRICAL CAPACITOR

[75] Inventors: Frederick W. MacDougall, Marion; Paul Winsor, IV, Somerset, both of Mass.

[73] Assignee: Aerovox Incorporated, New Bedford, Mass.

[21] Appl. No.: 293,749

[22] Filed: Jan. 3, 1989

[51] Int. Cl.⁵ .................... H01G 1/005; H01G 1/017
[52] U.S. Cl. ..................................... 361/273; 361/303
[58] Field of Search ................... 29/25, 42; 361/328, 361/330, 273, 275, 324, 308, 309, 310, 303, 304, 305, 311, 312, 313, 323, 530

[56] References Cited

U.S. PATENT DOCUMENTS

| | | | |
|---|---|---|---|
| 965,992 | 8/1910 | Dean | 361/273 |
| 2,634,315 | 4/1953 | Allison et al. | 361/308 X |
| 3,211,973 | 10/1965 | Ferrante | 361/303 |
| 3,419,770 | 12/1968 | Tomago et al. | 361/273 X |
| 3,457,478 | 7/1969 | Lehrer | 361/304 |
| 3,596,152 | 7/1971 | Allison et al. | 361/303 |
| 3,665,268 | 5/1972 | Behn et al. | 361/304 |
| 3,789,277 | 1/1974 | Craig et al. | 361/323 X |
| 3,836,830 | 9/1974 | Amayovich et al. | 361/330 |
| 3,855,507 | 12/1974 | Hoyler | 361/273 X |
| 3,906,312 | 9/1975 | Stiefvater | 361/273 X |
| 3,906,600 | 9/1975 | Rice | 361/273 X |
| 4,142,222 | 2/1979 | Kotschy et al. | 361/304 X |
| 4,163,956 | 8/1979 | Garlington et al. | 361/303 X |
| 4,345,298 | 8/1982 | Grahame | 361/273 |
| 4,424,615 | 1/1984 | Wakino | 29/25.42 X |
| 4,570,201 | 2/1986 | Bentley | 361/323 |
| 4,586,112 | 4/1986 | MacDougall | 361/330 |
| 4,694,377 | 9/1987 | MacDougall et al. | 361/275 |

*Primary Examiner*—Donald A. Griffin
*Attorney, Agent, or Firm*—Fish & Richardson

[57] ABSTRACT

An electrical capacitor having two capacitively coupled electrode structures, each electrode structure having first and second generally planar conductive portions respectively having higher and lower current-carrying capacity, the electrode structures having configurations and relative orientations such that a line normal to the first conductive portion of one electrode structure does not intersect the first conductive portion of the other electrode structure.

8 Claims, 1 Drawing Sheet

ELECTRICAL CAPACITOR

BACKGROUND OF THE INVENTION

This invention relates to high energy density electrical capacitors.

In typical wound capacitors with electrodes made of solid metal foils, damage to the dielectric system during manufacture (resulting from, e.g., local imperfections in the dielectric, irregularities in the electrodes, or foreign particles) may cause the capacitor to break down when energized, rendering it unusable.

So-called self-clearing capacitors use metallized electrodes, each composed of a dielectric backing (e.g., paper or polypropylene), coated with a thin metal layer. When an appropriate voltage is applied, the metal is vaporized or converted to a nonconductive metal oxide at points were defects exist. Conduction through the dielectric is thereby eliminated at damaged places, rendering the capacitor usable.

The thin metal coating of metallized electrodes is delicate and easily detached from or vaporized along the line of contact with the solid metal terminals of the capacitor, thus limiting the current capacity of the capacitor.

SUMMARY OF THE INVENTION

A general aspect of the invention is an electrical capacitor having two capacitively coupled electrode structures, each electrode structure having first and second generally planar conductive portions respectively having higher and lower current-carrying capacity, the electrode structures having configurations and relative orientations such that a line normal to the first conductive portion of the electrode structure does not intersect the first conductive portion of the other electrode structure.

Preferred embodiments of the invention include the following features. The first and second conductive portions comprise two layers of the electrode structure, and the two layers have surface areas in contact with each other. The first conductive portion comprises solid metal (e.g., a distinct solid metal foil) and the second conductive portion comprises a metallized coating (which the metal foil overlaps and is in contact with). A terminal is connected electrically and mechanically to the first conductive portion with a coating thickness of no more than an average of 2000 Å, and no less than 10 Å.

The invention combines the advantages of metallized and solid foil electrodes in a single capacitor. The solid metal portions provide a sturdy terminal connection and a broad area of electrical connection to the metallized layers, and hence high current-carrying capability. The metallized portions impart a self-clearing property.

Other advantages and features will become apparent from the following description of the preferred embodiment, and from the claims.

DESCRIPTION OF THE PREFERRED EMBODIMENT

We first briefly describe the drawings.

STRUCTURE

Figure 1:
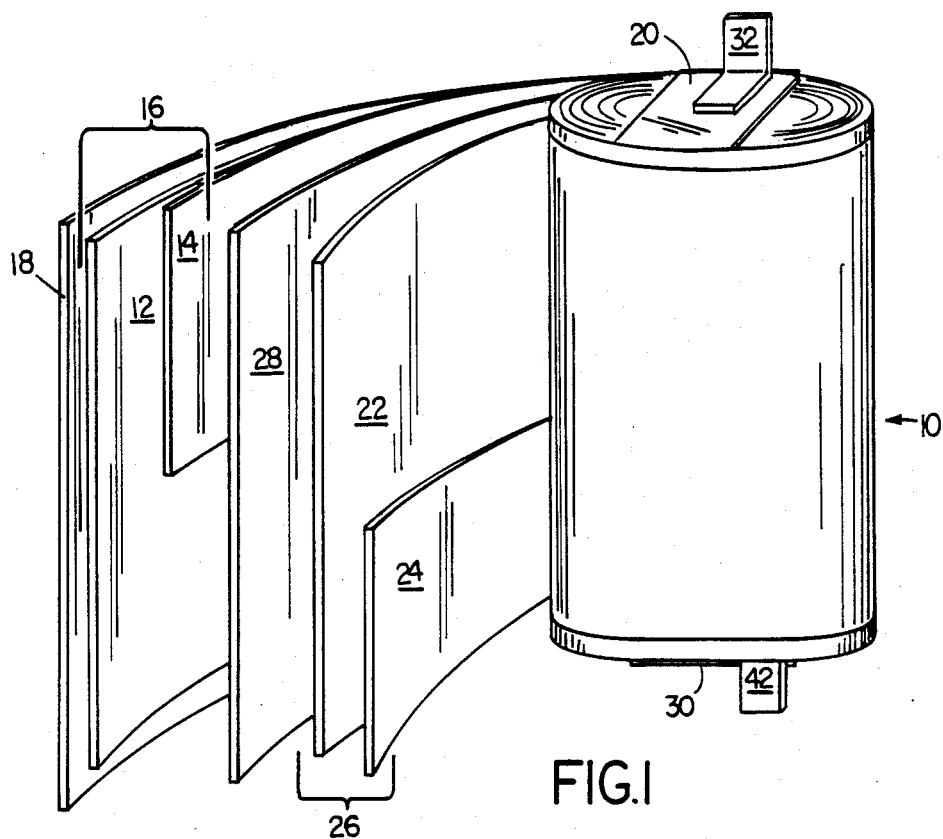
FIG. 1 is a perspective view of a wound capacitor element, removed from its can and partially unwound.
Figure 2:
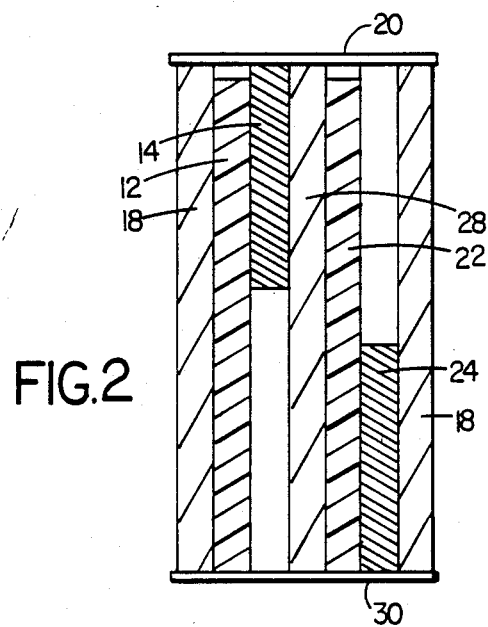
FIG. 2 is a schematic partial sectional view, not to scale, of layers of the capacitor.

Referring to FIGS. 1 and 2, self-healing, high energy, wound capacitor 10 has two generally planar metallized electrodes 12, 22 which are in contact respectively with two generally planar solid aluminum foil strips 14, 24. The foil strips 14, 24 have the same width and each is less than half the width of electrodes 12, 22. Strips 14, 24 are placed one at the top end and one at the bottom end of the capacitor so they do not spatially overlap, that is, so that a line normal to either foil 14, 24 does not intersect the other foil. On the other hand, each foil 14, 24 does overlap and is in contact with the corresponding metallized electrode 12, 22 over nearly half its area, providing a large area of contact capable of carrying a high current between each foil and its related metallized electrode.

Two electrode structures 16, 26 are thus formed respectively by electrode 12 and foil 14, and by electrode 22 and foil 24. These two electrode structures are separated by dielectric strips 18, 28 which extend the full width of the capacitor. Each metallized electrode 12, 22 has a paper substrate, coated on both sides with a layer of aluminum thin enough to be vaporized and thus be self-clearing (i.e., no more than an average of 2000 Å and preferably no less than 10 Å thick). The dielectric strips 18, 28 and the substrate of the metallized electrodes are impregnated with a dielectric fluid. The paper substrate acts as a wick to draw the dielectric fluid into the capacitor during manufacture.

The ends 20, 30 of the capacitor are coated with zinc to make good mechanical and electrical connections between the terminal tabs 32, 42, and the top and bottom edges, respectively, of foil strips 14, 24. Foil strips 14, 24, and dielectric strips 18, 28 extend to the ends 20, 30 of the capacitor, so as to contact the zinc coating, whereas the metallized electrodes 12, 22 are somewhat narrower than the dielectric strips and are thus not in contact with the ends 20, 30 of the capacitor. The sturdy connections between coatings 20, 30, and foil strips 14, 24, and the broad areas of contact between foil strips 14, 24, and metallized electrodes 12, 22 permit quick discharge of the capacitor and remain strong even when subjected to high current.

Terminal tabs 32, 42 are thus connected electrically with metallized electrodes 12, 22, respectively, via the zinc and the foil strips 14, 24, respectively. There is no direct mechanical contact between the zinc and the metallized electrodes 12, 22. The electrode structures 16, 26 are capacitively coupled to each other through dielectric strips 18, 28. In particular, foils 14, 24 are respectively coupled to metallized electrodes 22, 12 via dielectric strips 28, 18, and different portions of metallized electrodes 22, 12 are also coupled to each other respectively via dielectric strips 28, 18.

OPERATION

Capacitor 10 is charged by applying a voltage across terminal tabs 32, 42. When the voltage exceeds a certain level, the coating of metallized electrodes 12, 22 will vaporize or convert to non-conducting material at the locations of any faults. Because the foils do not overlap, foil-to-foil breakdown is prevented, and the electrical connection between the tabs 32, 42 and the electrode structures 16, 26 is preserved even under high energy density conditions.

Other embodiments are within the following claims. For example, the metallized electrodes could be coated on only one side, so that the substrate material functions as part of the dielectric, allowing the capacitor to be more compact.

We claim:

1. An electrical capacitor comprising
   a first dielectric layer;
   a first metallized electrode adjacent to and in contact with said first dielectric layer, said first metallized electrode comprising a second dielectric layer having two surfaces coated with metal;
   a first metal electrode adjacent to and in contact with said first metallized electrode;
   a third dielectric layer adjacent to and in contact with said first metal electrode;
   a second metallized electrode adjacent to and in contact with said third dielectric layer, said second metallized electrode comprising a forth dielectric layer having two surfaces coated with metal; and
   a second metal electrode adjacent to and in contact with said second metallized electrode,
   wherein said first and second metal electrodes are configured such that a line normal to said first metal electrode does not intersect with said second metal electrode.

2. The capacitor of claim 1 further comprising a terminal, connected electrically and mechanically to one of the first conductive portions.

3. The capacitor of claim 1 wherein the first metal electrode and the second metal electrode are the same width.

4. The capacitor of claim 1 in which the metal on each of the surfaces of the second and forth dielectric layers is no more than an average of 2000 Å thick.

5. The capacitor of claim 1 in which the metal on each of the surfaces of the second and forth dielectric layers is no less than 10 Å thick.

6. The capacitor of claim 1 wherein each dielectric layer is impregnated with a dielectric fluid.

7. The capacitor of claim 1 wherein each of said first metal electrode and said second metal electrode comprises a metal foil.

8. An electrical capacitor comprising
   a first dielectric layer;
   a first metallized electrode adjacent to and in contact with said first dielectric layer, said first metallized electrode comprising a second dielectric layer having each of its surfaces coated with metal;
   a first metal electrode adjacent to and in contact with said first metallized electrode, said first metal electrode having an area no greater than half the area of said first metallized electrode;
   a third dielectric layer adjacent to and in contact with said first metal electrode;
   a second metallized electrode adjacent to and in contact with said third dielectric layer, said second metallized electrode comprising a forth dielectric layer having two surfaces coated with metal; and
   a second metal electrode adjacent to and in contact with said second metallized electrode, said second metal electrode having an area no greater than half the area of said second metallized electrode;
   wherein said first and second metal electrodes are configured such that a line normal to said first metal electrode does not intersect with second metal electrode.

* * * * *